Figure 1:
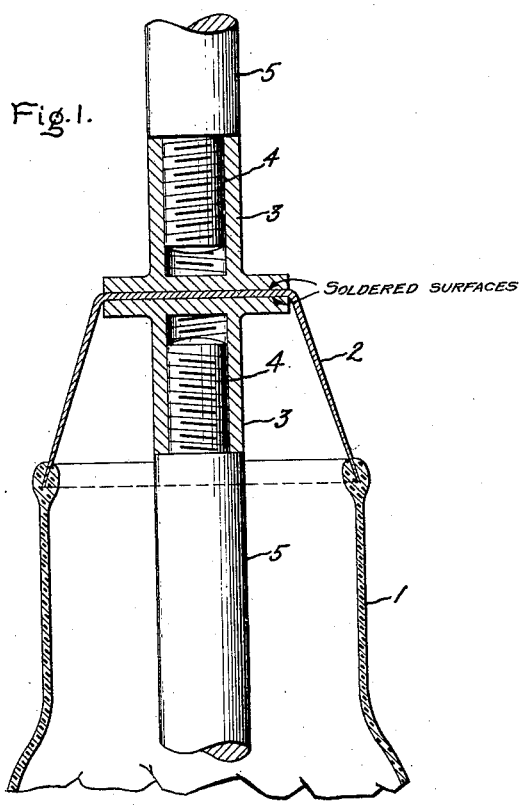

Oct. 4, 1932.  B. WELLMAN  1,880,571
GLASS TO METAL SEAL
Filed Jan. 28, 1929

Inventor:
Bertram Wellman,
by Charles E. Mullar
His Attorney.

Patented Oct. 4, 1932

1,880,571

UNITED STATES PATENT OFFICE

BERTRAM WELLMAN, OF SCHENECTADY, NEW YORK, ASSIGNOR TO GENERAL ELECTRIC COMPANY, A CORPORATION OF NEW YORK

GLASS TO METAL SEAL

Application filed January 28, 1929. Serial No. 335,492.

The present invention relates generally to structures, containers or tubes which in use are exhausted to considerably below atmospheric pressure, consisting of glass and metal elements hermetically sealed together and more particularly to joining glass to copper wherein the metal serves as a leading-in conductor of high current carrying capacity.

In forming a seal between the glass envelope of a large power device and an intercepted body of metal of considerable size, which body ordinarily constitutes a leading-in conductor or an electrode support, it is customary to provide the metal member with an open-ended conical sleeve portion which extends radially and angularly as a skirt from the surface of the conductor, also tapering in thickness along the perimeter to a knife-edge. The conical member is usually fabricated apart from the conductor and has a smaller diameter such as to fit snugly above the surface of the latter, the joint between the metal members being rendered airtight by soldering. The glass is then fused as a thick bead to the thin outer edge of the sleeve member in the well known manner; the conical member together with the conductor thus serves as a closure for the envelope. It has been found that under high operating temperatures the seal between the glass bead and the sharp edge of the material remains strictly effective but there is a considerable possibility that fissures, interstices of minute character or other form of vacuum failure may develop at the soldered joint notwithstanding the care with which the solder or other uniting material is applied. Moreover, in the event that the solder is not properly applied, the chances of tube failure are further increased. The extreme care thus necessary in forming the joint between the metal parts adds greatly to the cost of the completed device.

Some of the objects of the present invention are: to provide an improved hermetic seal between two abutting metal surfaces; to affix a sealing sleeve to a conductor of large current carrying capacity without necessitating the use of solder or other uniting material applied in such a position with respect to the seal as may give rise to leakage; to provide a joint of this character which calls for no unusual care or equipment in fabrication so as readily to lend itself to factory methods of production and in general, to improve, simplify and render less costly the construction of large power tubes which employ an envelope containing glass and metal parts sealed together. These objects are attained, briefly, by forming the sleeve which is sealed to the glass as a cup or other suitably shaped element, closed at one end by a flat base and securing the base to the conductor by a uniting material in such a manner that this material does not form part of the hermetic seal and hence can offer no opportunity for air or gas leakage. As a modified structural arrangement the base and conductor may be welded together thus obtaining the uniting material from the surfaces joined. In both cases the uniting material is positioned remote from the seal which thus remains absolutely air-tight under all operating conditions. Other objects and features will be apparent as a specification is perused in connection with the accompanying drawing in which Fig. 1 is a view partly in cross section of the improved seal, while Fig. 2 represents a preferred mode of fabricating the conical sleeve.

Referring to Fig. 1, numeral 1 designates the glass envelope of an electrical discharge device containing a plurality of cooperating electrodes and through which it is desired to pass a leading-in conductor of considerable size; the envelope terminates in a sealing bead. The seal structure for carrying the conductor consists of a metallic sleeve 2 illustrated in the form of a frustro-conical cup-shaped element, but which may assume any suitable shape, disposed between two flanged members 3, 3, which are adapted to receive the conductor. The members 3 contain threaded bores 4 into which current carrying rods 5, 5 may be screwed. While the sleeve 2 may be secured to the members 3, 3 in any suitable manner, I prefer to silver solder the abutting surfaces. These surfaces may be joined together by first applying the solder conveniently over both sides of the base of the cone before assembly after which the members 3, 3 are positioned in the manner shown and the entire structure heated either in an oven or by passing current through the rods 5, 5 to melt the solder. In the event the seal is made of copper which is usually the case, another convenient method of securing the members together is to omit the solder and to weld the various surfaces by simply passing a heating current serially through the conductors simultaneously pressing the members together; the metal of the joined members constitutes the uniting material in this case. Other methods for rigidly affixing the various members will doubtless suggest themselves to those skilled in the art. It will be noted, however, that regardless of the manner in which the various members are secured together no solder or other uniting material is required at the place where the sleeve merges with the conductor and hence, no opportunity is afforded for hermetic failure. The solder or other uniting material which is employed between the flat surfaces of the sleeve and the conducting members is so located that it is not in a position to serve as any part of the hermetic seal. The metallic cone member constitutes an integral element and positively precludes leakage between the evacuated space and the interior of the envelope.

Figure 2:
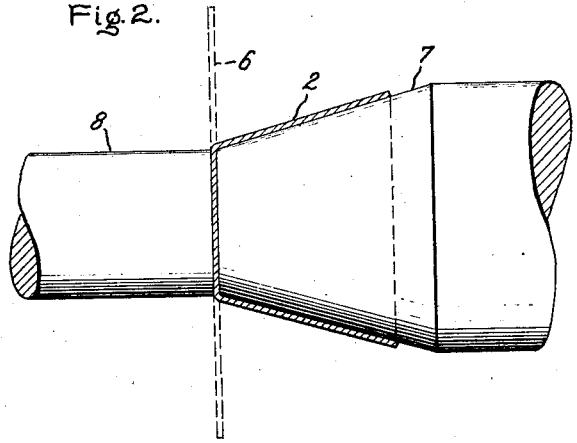

Fig. 2 illustrates one of the several practical modes of manufacturing the cup-shaped sleeve member 2. The first step is to clamp a flat sheet of metal 6 of requisite thickness and of sufficient material to constitute the entire member between a cylindrical support 7 shaped and dimensioned to correspond with the interior configuration of the cup and a cylindrical member 8 of a diameter which corresponds roughly to that of the base of the cup. The support 7 and member 8 are adapted to rotate in a lathe and there is provided a means for exerting a compressional stress on these elements. It is evident that the members 7 and 8, in rotating, also carry the metallic sheet around so that a portion of the latter may be spun over until it rests on the member 7, the latter serving as a support while machining the outer surface of the spun portion to a knife-like sealing edge.

What I claim as new and desire to secure by Letters Patent of the United States, is:

A seal between a glass envelope and a conductor comprising a metallic cup-shaped sealing member having a closed base, a plurality of metallic members positioned on opposite sides of said base, said members being bored and threaded to receive the threaded portion of a conductor and means for securing together said members and the base, said means comprising a solder material positioned between said metallic members and said base.

In witness whereof, I have hereunto set my hand this 26th day of January, 1929.

BERTRAM WELLMAN.